(12) United States Patent
Parkvall et al.

(10) Patent No.: US 10,516,559 B2
(45) Date of Patent: *Dec. 24, 2019

(54) PREFIXING OF OFDM SYMBOLS TO SUPPORT VARIABLE SUBFRAME LENGTH

(71) Applicant: Telefonaktiebolaget LM Ericsson (publ), Stockholm (SE)

(72) Inventors: Stefan Parkvall, Bromma (SE); Erik Dahlman, Stockholm (SE); Asbjörn Grövlen, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,678

(22) Filed: Nov. 21, 2018

(65) Prior Publication Data

US 2019/0089563 A1 Mar. 21, 2019

Related U.S. Application Data

(63) Continuation of application No. 15/544,058, filed as application No. PCT/SE2017/050480 on May 12, 2017, now Pat. No. 10,193,724.

(30) Foreign Application Priority Data

May 24, 2016 (WO) ................ PCT/CN2016/083213

(51) Int. Cl.
*H04L 27/26* (2006.01)
*H04L 5/00* (2006.01)

(52) U.S. Cl.
CPC .......... *H04L 27/2602* (2013.01); *H04L 5/003* (2013.01); *H04L 27/2607* (2013.01)

(58) Field of Classification Search
CPC .......... H04W 72/1215; H04L 27/2601; H04L 27/2602; H04L 27/2607; H04L 1/1861;
(Continued)

(56) References Cited

U.S. PATENT DOCUMENTS

2017/0156140 A1 6/2017 Islam et al.
2018/0234276 A1* 8/2018 Parkvall .................. H04L 5/003

OTHER PUBLICATIONS

LG Electronics, "Support different numerology and different usage scenarios", 3GPP TSG RAN WG1 Meeting #85, May 23-27, 2016, pp. 1-6, Nanjing, China, R1-164561.
(Continued)

*Primary Examiner* — Rahel Guarino
(74) *Attorney, Agent, or Firm* — Coats & Bennett, PLLC (57) ABSTRACT

The present disclosure relates to a first radio node configured for orthogonal frequency division multiplexing (OFDM), comprising a receiver, a transmitter, a processor and a memory storing instructions executable by the processor for causing the transmitter in a first mode of operation with a first subcarrier spacing f1: to transmit a sequence of prefixed OFDM symbols, and in a second mode of operation with a second subcarrier spacing f2: to transmit a sequence of prefixed OFDM symbols, wherein the sequence of transmitted OFDM symbols is aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with p≠1 integer.

19 Claims, 7 Drawing Sheets

(58) Field of Classification Search
CPC ... H04L 27/2605; H04L 5/0035; Y02D 70/12; Y02D 70/126; Y02D 70/1262
See application file for complete search history.

(56) References Cited

OTHER PUBLICATIONS

LG Electronics, "Initial Evaluation Result for NR Numerology", 3GPP TSG RAN WG1 Meeting #85, May 23-27, 2016, pp. 1-14, Nanjing, China, R1-165431.

\* cited by examiner

PREFIXING OF OFDM SYMBOLS TO SUPPORT VARIABLE SUBFRAME LENGTH

This application is a Continuation application of pending U.S. application Ser. No. 15/544,058, filed 17 Jul. 2017, which National Phase of International Application No. PCT/SE2017/050480 filed 12 May 2017, which in turn claims priority to International Application No. PCT/CN2016/083213 filed 24 May 2016. The disclosures of each of these references are incorporated in their entireties by reference herein.

TECHNICAL FIELD

The present disclosure generally relates to the technical field of wireless communications, and particularly to radio nodes, methods, computer programs and computer program products for prefixing of OFDM symbols to support variable subframe length.

BACKGROUND

The upcoming 3rd Generation Partnership Project (3GPP) New Radio (NR) radio-access technology is based on Orthogonal Frequency Division Multiplexing (OFDM) and will support multiple numerologies in terms of subcarrier spacing, subframe (or slot) length etc. A basic subcarrier spacing f0 and a corresponding subframe design consisting of N OFDM symbols are used. Other numerologies are then achieved by scaling the basic subcarrier spacing $\Delta f$. For example, by using a subcarrier spacing of $2\Delta f$ the corresponding OFDM symbol is half as long as in the original case with $\Delta f$. The overall subframe of N OFDM symbols will consequently also be half as long as in the original case. Having the possibility for different numerologies can be beneficial in order to support different services with different requirements in terms of latency; a latency-critical service requiring low latency can use a higher subcarrier spacing and a correspondingly shorter subframe duration.

To allow for coexistence with Long Term Evolution (LTE), in particular Narrow Band Internet of Things (NB-IoT), it is beneficial to use the same subcarrier spacing f0 as in LTE and 3GPP has therefore agreed on $\Delta f=15$ kHz. Furthermore, the LTE slot/subframe structure is beneficial. In LTE, a slot consists of 7 OFDM symbols where the first OFDM symbol has a slightly longer cyclic prefix (CP) than the others. More specifically, in LTE an OFDM symbol without cyclic prefix is 2048 Ts long where Ts is the basic time unit, Ts=1/(2048×15000) seconds. The first OFDM symbol has a cyclic prefix of 160 Ts and the remaining six OFDM symbols in the slot have a cyclic prefix of 144 Ts. This OFDM symbol is shown shaded grey in FIG. 1, while the white OFDM symbols have the slightly shorter cyclic prefix.

Figure 1:
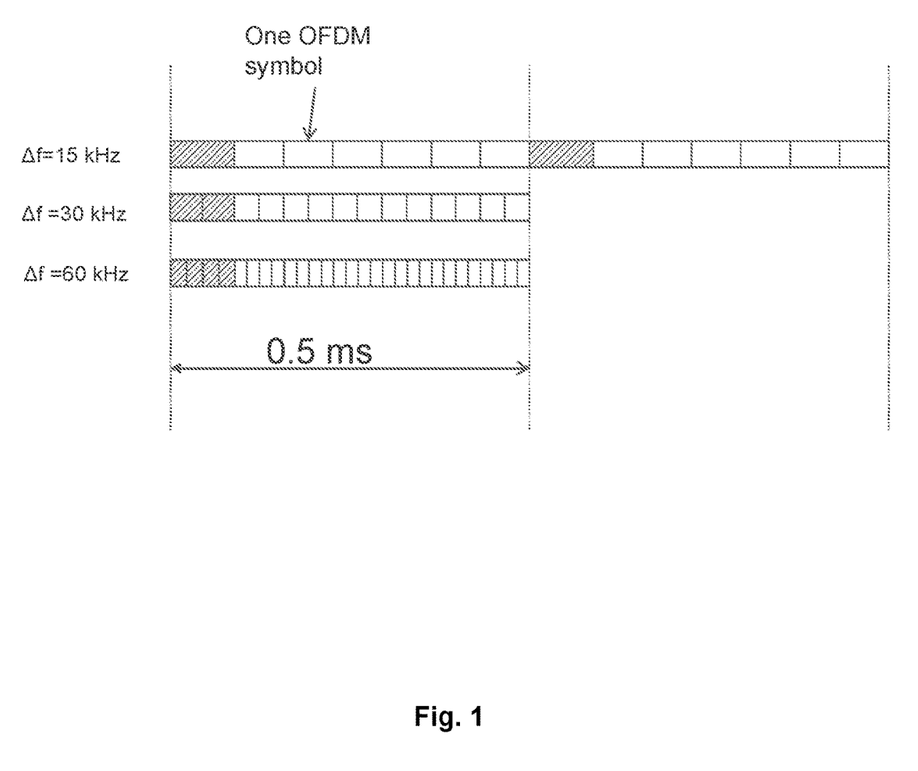
FIG. 1 shows subframe designs consisting of OFDM symbols for several different numerologies with subcarrier spacings higher than 15 kHz.

It is beneficial if the symbol boundaries across different numerologies are time aligned as this would allow for one "long" OFDM symbol to be replaced by two (or more) "short" OFDM symbols. One usage of this is multiplexing of different services, e.g., by "replacing" one long OFDM symbol in an ongoing transmission with two (or more) short symbols for transmission of a latency-critical message. This is straightforward when moving to higher values of $\Delta f$. Each OFDM symbol in the numerology with subcarrier spacing fi (=(i+1)*$\Delta f$) is split into two symbols with subcarrier spacing fi+1 (=(i+2)*$\Delta f$) as shown in FIG. 1 too. Note that this results in the first two symbols of the 30 kHz numerology in a 0.5 ms slot having a longer cyclic prefix than the remaining 12 symbols in order to maintain the symbol boundary alignment.

It is not unlikely that subcarrier spacings lower than 15 kHz are needed, e.g., for non-latency critical machine-type communication (MTC) services or for broadcast services. One possibility to achieve this is to use the approach described above with f0 set to the lowest possible subcarrier spacing desired, e.g., 3.75 kHz. However, when this structure is scaled to 15 kHz the result would not match the LTE slot structure and as a result degrade the coexistence between NR and LTE.

SUMMARY

In view of the foregoing, an object of the present disclosure is to overcome at least one of the above-described drawbacks of the existing approaches for simply scaling of numerology while maintaining LTE compatibility at 15 kHz.

To achieve this object, according to a first aspect of the present disclosure, there is provided a first radio node configured for orthogonal frequency division multiplexing (OFDM). The first radio node comprises a receiver, a transmitter, a processor and a memory storing instructions executable by the processor for causing the transmitter
  in a first mode of operation with a first subcarrier spacing
    f1: to transmit a sequence of prefixed OFDM symbols; and
  in a second mode of operation with a second subcarrier spacing f2: to transmit a sequence of prefixed OFDM symbols.
The sequence of transmitted OFDM symbols is aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with p≠1 integer.

In one embodiment, each predefined repeating radio frame has a length of 1 ms and/or is a New Radio (NR) subframe.

In one embodiment, a total duration of one prefixed OFDM symbol transmitted in the first mode of operation is equal to a total duration of an integer number of prefixed OFDM symbols transmitted in the second mode of operation.

In one embodiment, a total duration of one prefixed OFDM symbol transmitted in the first mode of operation is equal to a total duration of an integer number of corresponding prefixed OFDM symbols transmitted in the second mode of operation.

In one embodiment, f1/f2=1/p and the integer number is p.

In one embodiment, at least two consecutive symbols in the second mode of operation have prefixes of unequal durations.

In one embodiment, in every 0.5 ms duration in the first or second mode of operation, the first prefixed OFDM symbol has a longer prefix than any remaining prefixed OFDM symbol(s), and the remaining prefixed OFDM symbols have prefixes of the same length.

In one embodiment, the duration of a non-prefixed symbol transmitted in the first mode of operation is constant and the duration of a non-prefixed symbol transmitted in the second mode of operation is constant.

In one embodiment, the beginning and end of said one prefixed OFDM symbol transmitted in the first mode of operation are aligned, with respect to the predefined repeating radio frame or a multiple of the predefined repeating radio frame, with the beginning and end of a sequence of an integer number of prefixed OFDM symbols transmitted in the second mode of operation.

In one embodiment, the beginning and end of said one prefixed OFDM symbol transmitted in the first mode of operation are aligned with the beginning and end of a sequence of an integer number of prefixed OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory further stores instructions executable by the processor causing the transmitter to prefix the OFDM symbols in such manner as to align, with respect to the predefined repeating radio frame, boundaries of at least some OFDM symbols transmitted in the first mode of operation with boundaries of at least some OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory further stores instructions executable by the processor causing the transmitter to prefix the OFDM symbols in such manner as to align boundaries of at least some OFDM symbols transmitted in the first mode of operation with boundaries of at least some OFDM symbols transmitted in the second mode of operation.

In one embodiment, alignment of boundaries occurs at least as often as the predefined repeating radio frame repeats.

In one embodiment, a total duration t1 of one non-prefixed OFDM symbol in the first mode of operation is an integer multiple of a duration t2 of one non-prefixed OFDM symbol in the second mode of operation. The memory further stores instructions executable by the processor causing the transmitter to assign prefixes of such lengths as to make the total duration of a first integer number $N_1$ of prefixed OFDM symbol transmitted in the first mode of operation equal to a total duration of a second integer number $N_2$ of prefixed OFDM symbols transmitted in the second mode of operation.

In one embodiment, the first integer number $N_1$ is 1 and the second integer number $N_2$ is greater than 1.

In one embodiment, the first integer number N1 is 1 and the second integer number N2 is greater than 1.

In one embodiment, with respect to the predefined repeating radio frame, a not-frame-initial boundary of a symbol transmitted in the first mode of operation is aligned with a not-frame-initial boundary of a symbol transmitted in the second mode of operation.

In one embodiment, the first and second subcarrier spacings are related by a power of two, $f1/f2=2^q$ or $f1/f2=2^{-q}$, with $q \neq 1$ integer.

In one embodiment, the first radio node is further operable in a third mode of operation with a third subcarrier spacing, wherein the first and third subcarrier spacings are related by a power of two, $f1/f3=2^r$ or $f1/f3=2^{-r}$, with $r \neq 1$ integer.

In one embodiment, the first subcarrier spacing f1 or the second subcarrier spacing f2 is a regular 3GPP LTE subcarrier spacing.

In one embodiment, the first subcarrier spacing f1 or the second subcarrier spacing f2=15 kHz.

In one embodiment, when the first subcarrier spacing f1=15 kHz, the second subcarrier spacing f2<15 kHz, or when the second subcarrier spacing f2=15 kHz, the first subcarrier spacing f1<15 kHz.

In one embodiment, the memory further stores instructions executable by the processor for causing the transmitter to transmit, in a same predefined repeating radio frame, at least one prefixed OFDM symbol in the first mode of operation and at least two OFDM prefixed symbols in the second mode of operation.

In one embodiment, a ratio of the first and second subcarrier spacings f1/f2 is equal to an inverse ratio of respective durations t1/t2 of non-prefixed OFDM symbols in the first and second modes of operation, f1/f2=t2/t1.

In one embodiment, the first radio node is a wireless device.

In one embodiment, the first radio node is a network node.

According to a second aspect of the present disclosure, there is provided a method in an orthogonal frequency division multiplexing (OFDM) first radio node. The method comprises: transmitting, in a first mode of operation with a first subcarrier spacing f1, a sequence of prefixed OFDM symbols; and transmitting, in a second mode of operation with a second subcarrier spacing f2, a sequence of prefixed OFDM symbols. The sequence of transmitted OFDM symbols is aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with $p \neq 1$ integer.

In one embodiment, the method further comprises alternating between the first and second modes of operation.

In one embodiment, said alternating is performed inside one radio frame.

According to a third aspect of the present disclosure, there is provided a second radio node configured for orthogonal frequency division multiplexing (OFDM). The second radio node comprises a receiver, a transmitter, a processor and a memory storing instructions executable by the processor for causing the receiver in a first mode of operation with a first subcarrier spacing f1: to receive a sequence of prefixed OFDM symbols from a first radio node, and in a second mode of operation with a second subcarrier spacing f2: to receive a sequence of prefixed OFDM symbols from a first radio node.

The receiver receives the sequence of received OFDM symbols assuming it to be nominally aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with $p \neq 1$ integer.

In one embodiment, each predefined repeating radio frame has a length of 1 ms and/or is a New Radio, NR, subframe.

In one embodiment, a total duration of one prefixed OFDM symbol transmitted in the first mode of operation is equal to a total duration of an integer number of prefixed OFDM symbols transmitted in the second mode of operation.

In one embodiment, a total duration of one prefixed OFDM symbol transmitted in the first mode of operation is equal to a total duration of an integer number of corresponding prefixed OFDM symbols transmitted in the second mode of operation.

In one embodiment, f1/f2=1/p and the integer number is p.

In one embodiment, at least two consecutive symbols in the second mode of operation have prefixes of unequal durations.

In one embodiment, in every 0.5 ms duration in the first or second mode of operation, the first prefixed OFDM symbol has a longer prefix than any remaining prefixed OFDM symbol(s), and the remaining prefixed OFDM symbols have prefixes of the same length.

In one embodiment, the duration of a non-prefixed symbol transmitted in the first second mode of operation is constant and the duration of a non-prefixed symbol transmitted in the second mode of operation is constant.

In one embodiment, the beginning and end of said one prefixed OFDM symbol transmitted in the first mode of operation are aligned, with respect to the predefined repeating radio frame or a multiple of the predefined repeating radio frame, with the beginning and end of a sequence of an integer number of prefixed OFDM symbols transmitted in the second mode of operation.

In one embodiment, the beginning and end of said one prefixed OFDM symbol transmitted in the first mode of operation are aligned with the beginning and end of a sequence of an integer number of prefixed OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory further stores instructions executable by the processor to the effect that the received OFDM symbols have nominally been prefixed in such manner as to align, with respect to the predefined repeating radio frame, boundaries of at least some OFDM symbols transmitted in the first mode of operation with boundaries of at least some OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory further stores instructions executable by the processor to the effect that the received OFDM symbols have nominally been prefixed in such manner as to align boundaries of at least some OFDM symbols transmitted in the first mode of operation with boundaries of at least some OFDM symbols transmitted in the second mode of operation.

In one embodiment, alignment of boundaries occurs at least as often as the predefined repeating radio frame repeats.

In one embodiment, a total duration t1 of one non-prefixed OFDM symbol in the first mode of operation is an integer multiple of a duration t2 of one non-prefixed OFDM symbol in the second mode of operation. The memory further stores instructions executable by the processor to the effect that the received OFDM symbols have nominally been assigned prefixes of such lengths as to make the total duration of a first integer number $N_1$ of prefixed OFDM symbol transmitted in the first mode of operation equal to a total duration of a second integer number $N_2$ of prefixed OFDM symbols transmitted in the second mode of operation.

In one embodiment, the first integer number $N_1$ is 1 and the second integer number $N_2$ is greater than 1.

In one embodiment, with respect to the predefined repeating radio frame, a not-frame-initial boundary of a symbol transmitted in the first mode of operation is nominally aligned with a not-frame-initial boundary of a symbol transmitted in the second mode of operation.

In one embodiment, the first and second subcarrier spacings are related by a power of two, $f1/f2=2^q$ or $f1/f2=2^{-q}$, with $q \neq 1$ integer.

In one embodiment, the first subcarrier spacing f1 or the second subcarrier spacing f2 is a regular 3GPP LTE subcarrier spacing.

In one embodiment, the first subcarrier spacing f1 or the second subcarrier spacing f2=15 kHz.

In one embodiment, when the first subcarrier spacing f1=15 kHz, the second subcarrier spacing f2<15 kHz, or when the second subcarrier spacing f2=15 kHz, the first subcarrier spacing f1<15 kHz.

In one embodiment, the memory further stores instructions executable by the processor for causing the receiver to receive, in a same radio frame, at least one OFDM symbol in the first mode of operation and at least two OFDM symbols in the second mode of operation.

In one embodiment, nominally a ratio of the first and second subcarrier spacings f1/f2 is equal to an inverse ratio of respective durations t1/t2 of non-prefixed OFDM symbols in the first and second modes of operation, f1/f2=t2/t1.

In one embodiment, the second radio node is a wireless device.

In one embodiment, the second radio node is a network node.

According to a fourth aspect of the present disclosure, there is provided a method in an orthogonal frequency division multiplexing (OFDM) second radio node. The method comprises: receiving, in a first mode of operation with a first subcarrier spacing f1, a sequence of prefixed OFDM symbols from a first radio node; and receiving, in a second mode of operation with a second subcarrier spacing f2, a sequence of prefixed OFDM symbols from a first radio node. The received sequence of OFDM symbols is assumed to be nominally aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with $p \neq 1$ integer.

In one embodiment, the method further comprises alternating between the first and second modes of operation.

In one embodiment, said alternating is performed inside one radio frame.

According to a fifth aspect of the present disclosure, there is provided a computer program comprising computer-readable instructions for causing a programmable processor to perform the method of the second or fourth aspect of the present disclosure.

According to a sixth aspect of the present disclosure, there is provided a computer program product comprising a computer-readable medium storing the computer program of the fifth aspect of the present disclosure.

BRIEF DESCRIPTION OF THE DRAWINGS

The above and other objects, features, and advantages of the present disclosure will become apparent from the following descriptions on embodiments of the present disclosure with reference to the drawings, on which.

In the drawings, similar or same steps and/or elements are designated with similar or same referential numbers. It is to be noted that not all the steps and/or elements shown in the drawings are necessary for some embodiments of the present disclosure. For simplicity and clarity, those optional steps and/or elements are shown in dashed lines.

DETAILED DESCRIPTION

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "base station", "user equipment", "access point" and "core network node" as used herein should be understood in a broad sense. Specifically, the base station should be understood to encompass a legacy base station in a 2nd Generation (2G) network, a NodeB in a 3rd Generation (3G) network, an evolved NodeB (eNode B) in a 4th Generation (4G) or future evolved network (e.g., LTE network, LTE-A network etc.), and the like. The user equipment should be understood to encompass a mobile telephone, a smartphone, a wireless-enabled tablet or personal computer, a wireless machine-to-machine unit, and the like. The access point should be understood to encompass a wireless switch, a wireless router, a wireless hub, a wireless bridge, or any device capable of being used in a wireless local area network for accessing functionalities, and the like. The core network node should be understood to encompass a Mobility Management Entity (MME), a Serving GPRS Support Node (SGSN), and the like.

According to the present disclosure, it is proposed to select the LTE subcarrier spacing as the base frequency, $f0=15$ kHz, and use different scaling strategy when increasing the subcarrier spacing compared to when decreasing the sub carrier spacing from this value.

When increasing the subcarrier spacing to 30 kHz, 60 kHz, 120 kHz and so on, each OFDM symbol of the lower numerology (i.e., the one with the lower subcarrier spacing) is split into two equal-length symbols in the higher numerology (i.e., the one with the higher subcarrier spacing). Note that in this case the "longer" cyclic prefix is located at the beginning of a 0.5 ms period.

Figure 2A:
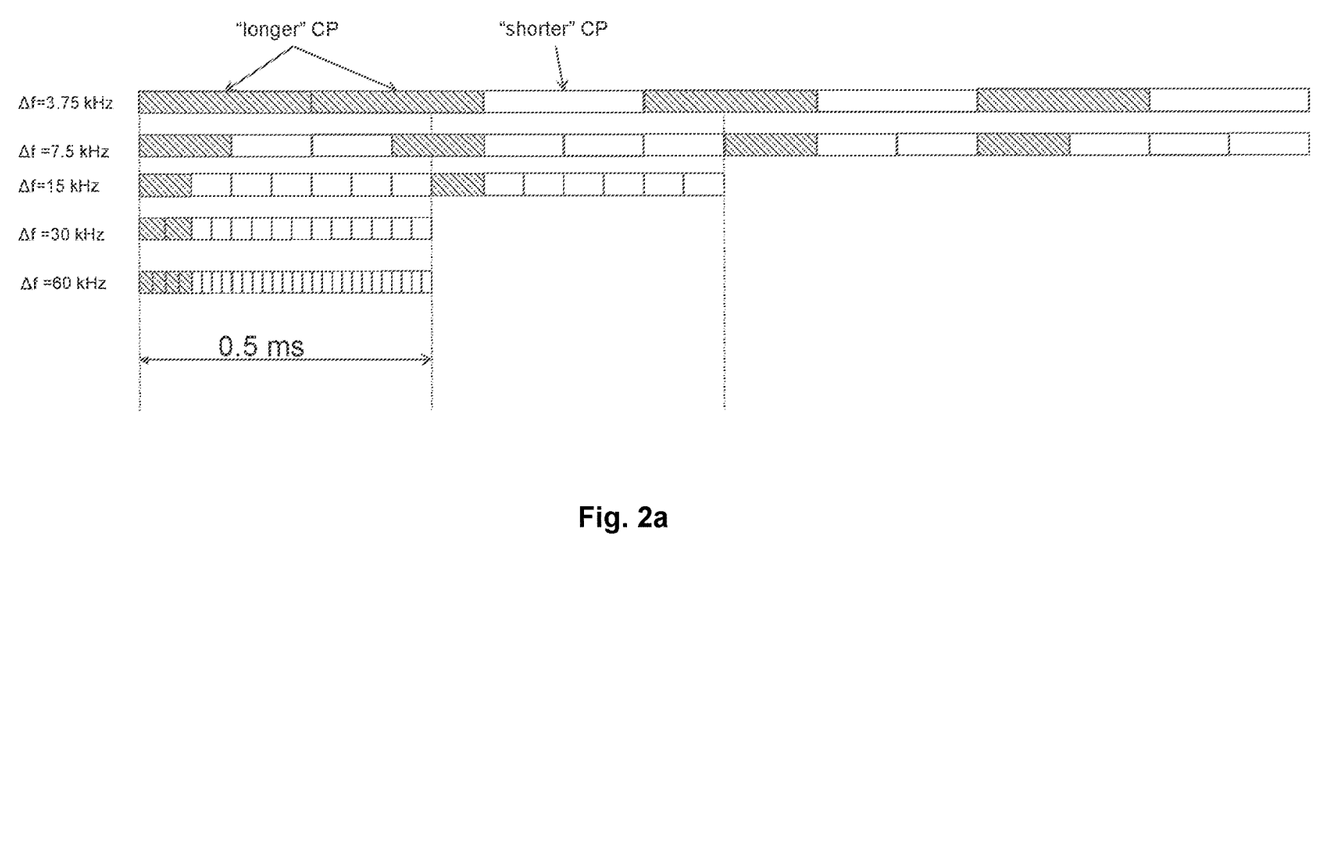
FIGS. 2a, 2b and 2c show subframe designs consisting of OFDM symbols for several different numerologies with subcarrier spacings higher and lower than 15 kHz according to embodiments of the present disclosure.
Figure 2B:
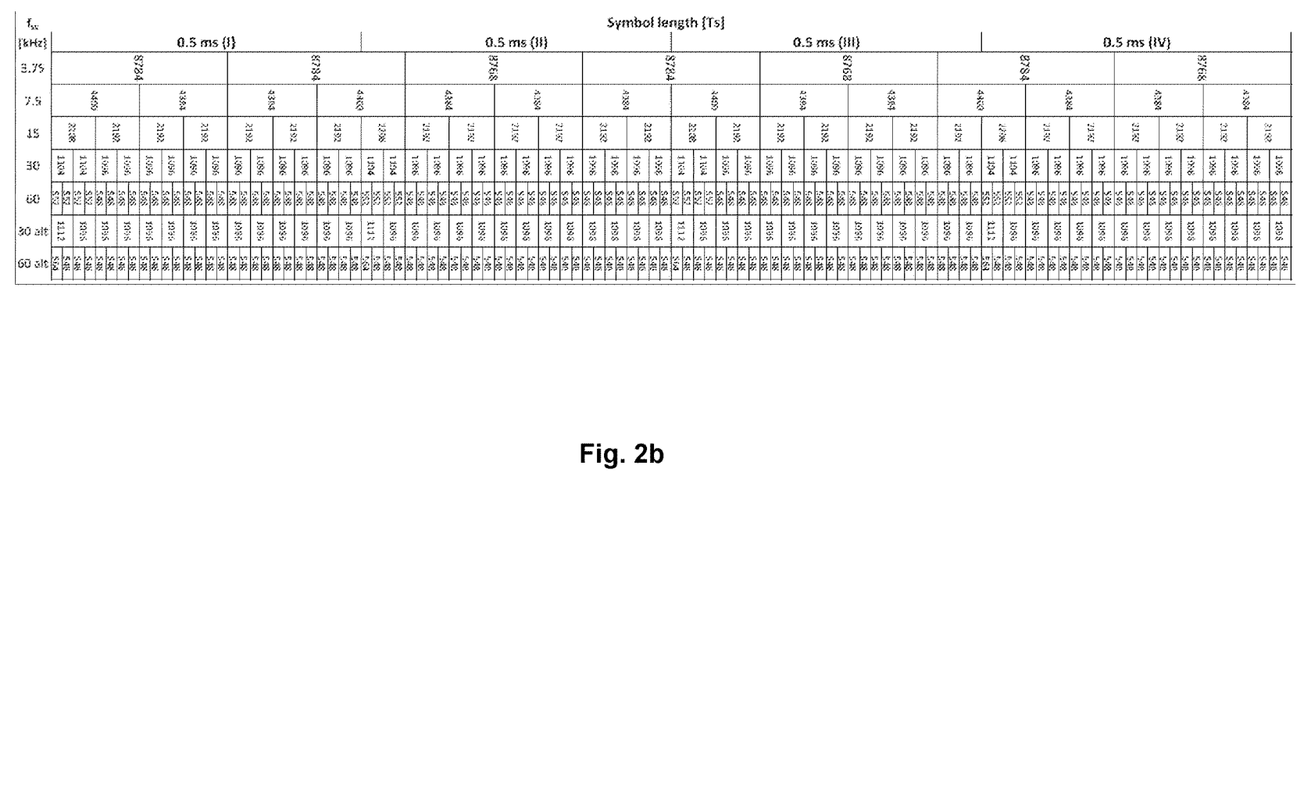
Figure 2C:
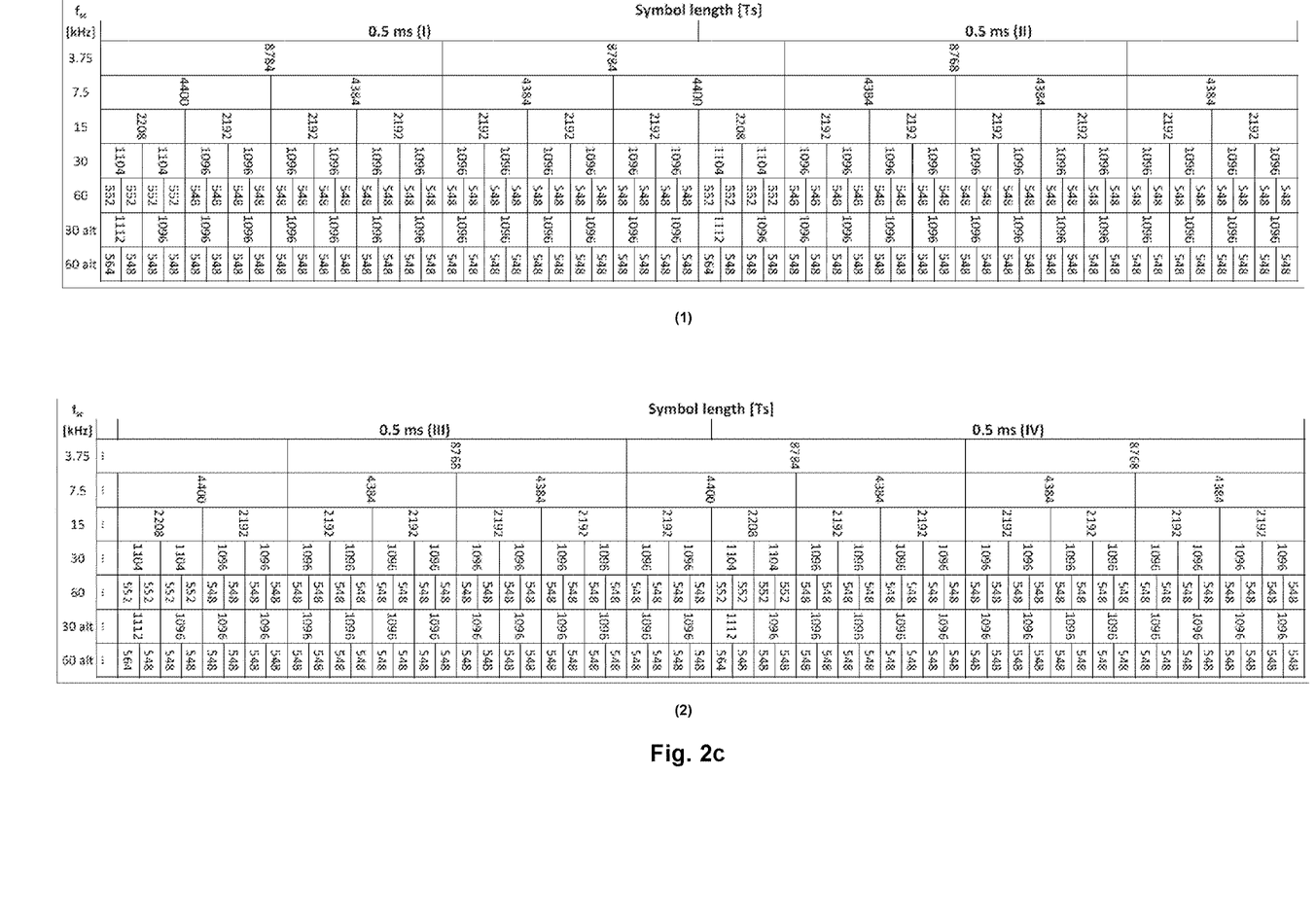

For example, as shown in FIG. 2a, each OFDM symbol of the numerology having subcarrier spacing of 15 kHz can be split into two equal-length OFDM symbols of the numerology having subcarrier spacing of 30 kHz, or four equal-length OFDM symbols of the numerology having subcarrier spacing of 60 kHz. This is also shown in rows "30" and "60" in FIG. 2b, which shows OFDM symbol durations (including CP) in multiples of LTE Ts over 2 ms. FIG. 2c is a magnified view of FIG. 2b shown in two portions, with the first two 0.5 ms periods (0.5 ms (I) and 0.5 ms (II)) shown in the upper portion (1) and the following two 0.5 ms periods (0.5 ms (III) and 0.5 ms (IV)) shown in the lower portion (2). Alternatively, as shown in rows "30 alt." and "60 alt." in FIG. 2b and FIG. 2c, the first OFDM symbol of the numerology having subcarrier spacing of 15 kHz can be split into two OFDM symbols of the numerology having subcarrier spacing of 30 kHz, or four OFDM symbols of the numerology having subcarrier spacing of 60 kHz, with only the first OFDM symbol in every 0.5 ms of the numerology having subcarrier spacing of 30 kHz or 60 kHz having the "longer" CP and the other OFDM symbols all having the same duration.

When decreasing the subcarrier spacing from 15 kHz to 7.5 kHz, 3.75 kHz, etc., OFDM symbols in the higher numerology are pairwise concatenated to create one OFDM symbol in the lower subcarrier spacing numerology. This results in the longer symbol (in the lower numerology) has a duration equal to two symbols with shorter CP or the sum of one symbol with longer CP and one symbol with shorter CP. Note that in this case the "longer" cyclic prefix is not necessary at the beginning of a set of a 0.5 ms period.

For example, as shown in FIG. 2a, FIG. 2b and FIG. 2c, each OFDM symbol of the numerology having subcarrier spacing of 3.75 kHz can have a duration equal to two corresponding OFDM symbols of the numerology having subcarrier spacing of 7.5 kHz, or four corresponding OFDM symbols of the numerology having subcarrier spacing of 15 kHz. In this context, one OFDM symbol of a numerology "corresponds" to two or four OFDM symbols of another numerology when the one OFDM symbol is aligned with the two or four OFDM symbols in the sense that they begin and end simultaneously.

Figure 3:
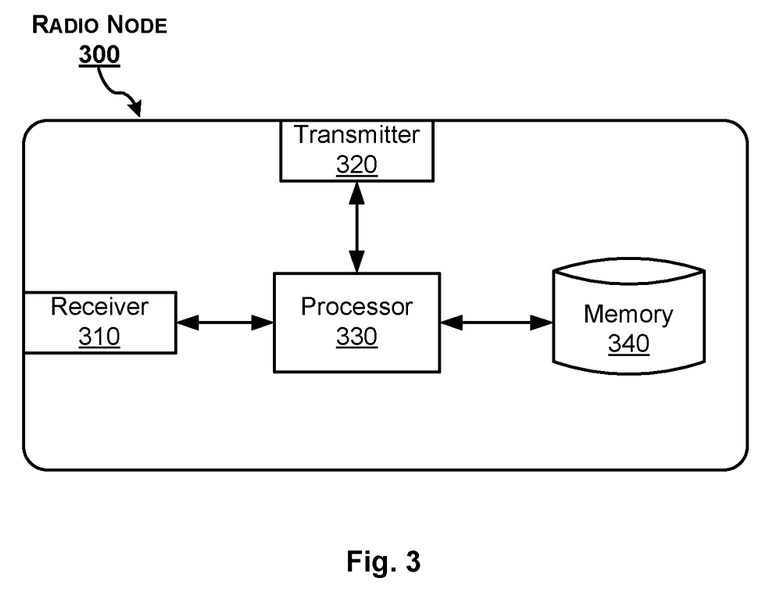
FIG. 3 is a schematic block diagram of radio node 300 according to some embodiments of the present disclosure.

FIG. 3 is a schematic block diagram of radio node 300 according to some embodiments of the present disclosure. The radio node 300 can be either a wireless device or a network node. The radio node 300 can be used as a first radio node configured for orthogonal frequency division multiplexing (OFDM). The radio node 300 includes a receiver 310, a transmitter 320, a processor 330 and a memory 340.

The memory 340 stores instructions executable by the processor 330 for causing the transmitter 320 in a first mode of operation with a first subcarrier spacing f1, to: transmit a sequence of prefixed OFDM symbols, and in a second mode of operation with a second subcarrier spacing f2, to transmit a sequence of prefixed OFDM symbols.

The sequence of transmitted OFDM symbols is aligned with a predefined repeating radio frame, which is common to both the first and second modes of operation, or with an integer multiple of the radio frame; and the first and second subcarrier spacings are related by an integer factor, f1/f2=p or f1/f2=1/p, with p≠1 integer. For example, as shown in FIG. 2, the f1 can be 15 kHz, and f2 can be 7.5 kHz or 30 kHz.

In one embodiment, each predefined repeating radio frame has a length of 1 ms and/or is a New Radio (NR) subframe.

In one embodiment, a total duration of one prefixed OFDM symbol transmitted in the first mode of operation is equal to a total duration of an integer number of prefixed OFDM symbols transmitted in the second mode of operation.

In one embodiment, a total duration of one prefixed OFDM symbol transmitted in the first mode of operation is equal to a total duration of an integer number of corresponding prefixed OFDM symbols transmitted in the second mode of operation. In this context, one OFDM symbol of a numerology "corresponds" to a number of OFDM symbols of another numerology when the one OFDM symbol is aligned with the number of OFDM symbols in the sense that they begin and end simultaneously.

In one embodiment, f1/f2=1/p and the integer number is p.

In one embodiment, at least two consecutive symbols in the second mode of operation have prefixes of unequal durations.

In one embodiment, in every 0.5 ms duration in the first or second mode of operation, the first prefixed OFDM symbol has a longer prefix than any remaining prefixed OFDM symbol(s), and the remaining prefixed OFDM symbols have prefixes of the same length. Examples for this can be seen in rows "30 alt" and "60 alt" in FIG. 2b and FIG. 2c.

In one embodiment, the duration of a non-prefixed symbol transmitted in the first mode of operation is constant and the duration of a non-prefixed symbol transmitted in the second mode of operation is constant.

In one embodiment, the beginning and end of said one prefixed OFDM symbol transmitted in the first mode of operation are aligned, with respect to the predefined repeating radio frame or a multiple of the predefined repeating radio frame, with the beginning and end of a sequence of an integer number of prefixed OFDM symbols transmitted in the second mode of operation.

In one embodiment, the beginning and end of said one prefixed OFDM symbol transmitted in the first mode of operation are aligned with the beginning and end of a sequence of an integer number of prefixed OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory 340 further stores instructions executable by the processor 330 causing the transmitter 320 to prefix the OFDM symbols in such manner as to align, with respect to the predefined repeating radio frame, boundaries of at least some OFDM symbols transmitted in the first mode of operation with boundaries of at least some OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory 340 further stores instructions executable by the processor 320 causing the transmitter 320 to prefix the OFDM symbols in such manner as to align boundaries of at least some OFDM symbols transmitted in the first mode of operation with boundaries of at least some OFDM symbols transmitted in the second mode of operation.

In one embodiment, alignment of boundaries occurs at least as often as the predefined repeating radio frame repeats.

In one embodiment, a total duration t1 of one non-prefixed OFDM symbol in the first mode of operation is an integer multiple of a duration t2 of one non-prefixed OFDM symbol in the second mode of operation. The memory 340 further stores instructions executable by the processor 330 causing the transmitter 320 to assign prefixes of such lengths as to make the total duration of a first integer number $N_1$ of prefixed OFDM symbol transmitted in the first mode of operation equal to a total duration of a second integer number $N_2$ of prefixed OFDM symbols transmitted in the second mode of operation.

In one embodiment, the first integer number $N_1$ is 1 and the second integer number $N_2$ is greater than 1.

In one embodiment, with respect to the predefined repeating radio frame, a not-frame-initial boundary of a symbol transmitted in the first mode of operation is aligned with a not-frame-initial boundary of a symbol transmitted in the second mode of operation.

In one embodiment, the first and second subcarrier spacings are related by a power of two, $f1/f2=2^q$ or $f1/f2=2^{-q}$, with q≠1 integer.

In one embodiment, the first radio node 300 is further operable in a third mode of operation with a third subcarrier spacing, wherein the first and third subcarrier spacings are related by a power of two, $f1/f3=2^r$ or $f1/f3=2^{-r}$, with r≠1 integer.

In one embodiment, the first subcarrier spacing f1 or the second subcarrier spacing f2 is a regular 3GPP LTE subcarrier spacing.

In one embodiment, the first subcarrier spacing f1 or the second subcarrier spacing f2=15 kHz.

In one embodiment, when the first subcarrier spacing f1=15 kHz, the second subcarrier spacing f2<15 kHz, or when the second subcarrier spacing f2=15 kHz, the first subcarrier spacing f1<15 kHz.

In one embodiment, the memory 340 further stores instructions executable by the processor 330 for causing the transmitter 320 to transmit, in a same predefined repeating radio frame, at least one prefixed OFDM symbol in the first mode of operation and at least two OFDM prefixed symbols in the second mode of operation.

In one embodiment, a ratio of the first and second subcarrier spacings f1/f2 is equal to an inverse ratio of respective durations t1/t2 of non-prefixed OFDM symbols in the first and second modes of operation, f1/f2=t2/t1.

Figure 4:
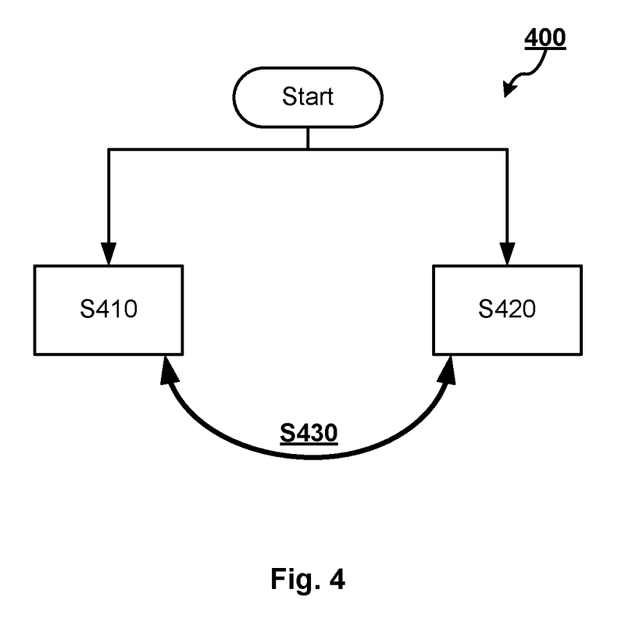
FIG. 4 is a flow chart showing a method 400 in a radio node according to some embodiments of the present disclosure.

FIG. 4 is a flow chart showing a method 400 in a radio node according to some embodiments of the present disclosure.

The method 400 comprises steps S410 and S420. In step S410, the radio node is in a first mode of operation with a first subcarrier spacing f1, a sequence of prefixed OFDM symbols is transmitted. In step S420, the radio node is in a second mode of operation with a second subcarrier spacing f2, a sequence of prefixed OFDM symbols is transmitted. In the method 400, the sequence of transmitted OFDM symbols is aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with p≠1 integer.

In one embodiment, the method 400 further includes a step S430 of alternating between the first and second modes of operation (double-ended arrow in FIG. 4). Furthermore, said alternating is performed inside one radio frame.

Figure 5:
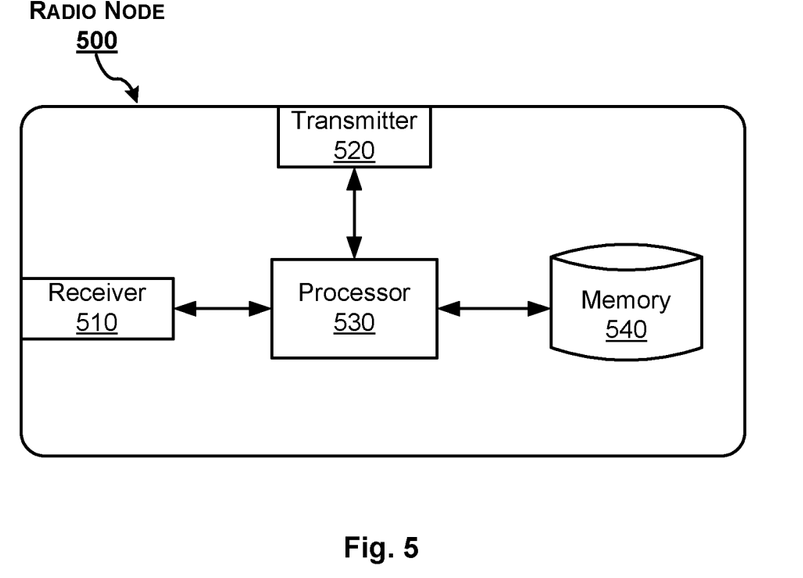
FIG. 5 is a schematic block diagram of radio node 500 according to some embodiments of the present disclosure.

FIG. 5 is a schematic block diagram of radio node 500 according to some embodiments of the present disclosure. The radio node 500 can be either a wireless device or a network node. The radio node 500 can be used as a second radio node configured for orthogonal frequency division multiplexing (OFDM). The radio node 500 includes a receiver 510, a transmitter 520, a processor 530 and a memory 540.

The memory 540 stores instructions executable by the processor 530 for causing the receiver 510
  in a first mode of operation with a first subcarrier spacing f1: to receive a sequence of prefixed OFDM symbols from a first radio node, and
  in a second mode of operation with a second subcarrier spacing f2: to receive a sequence of prefixed OFDM symbols from a first radio node.
The receiver 510 receives the sequence of received OFDM symbols assuming it to be nominally aligned with a predefined repeating radio frame, which is common to both the first and second modes of operation, or with an integer multiple of the predefined repeating radio frame; and the first and second subcarrier spacings are related by an integer factor, f1/f2=p or f1/f2=1/p, with p≠1 integer. For example, as shown in FIG. 2, the f1 can be 15 kHz, and f2 can be 7.5 kHz or 30 kHz.

In one embodiment, each predefined repeating radio frame has a length of 1 ms and/or is a New Radio, NR, subframe.

In one embodiment, a total duration of one prefixed OFDM symbol transmitted in the first mode of operation is equal to a total duration of an integer number of prefixed OFDM symbols transmitted in the second mode of operation.

In one embodiment, a total duration of one prefixed OFDM symbol transmitted in the first mode of operation is equal to a total duration of an integer number of corresponding prefixed OFDM symbols transmitted in the second mode of operation.

In one embodiment, f1/f2=1/p and the integer number is p.

In one embodiment, at least two consecutive symbols in the second mode of operation have prefixes of unequal durations.

In one embodiment, in every 0.5 ms duration in the first or second mode of operation, the first prefixed OFDM symbol has a longer prefix than any remaining prefixed OFDM symbol(s), and the remaining prefixed OFDM symbols have prefixes of the same length. Examples for this can be seen in rows "30 alt." and "60 alt." in FIG. 2b and FIG. 2c.

In one embodiment, the duration of a non-prefixed symbol transmitted in the first second mode of operation is constant and the duration of a non-prefixed symbol transmitted in the second mode of operation is constant.

In one embodiment, the beginning and end of said one prefixed OFDM symbol transmitted in the first mode of operation are aligned, with respect to the predefined repeating radio frame or a multiple of the predefined repeating radio frame, with the beginning and end of a sequence of an integer number of prefixed OFDM symbols transmitted in the second mode of operation.

In one embodiment, the beginning and end of said one prefixed OFDM symbol transmitted in the first mode of operation are aligned with the beginning and end of a sequence of an integer number of prefixed OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory 540 further stores instructions executable by the processor 530 to the effect that the received OFDM symbols have nominally been prefixed in such manner as to align, with respect to the predefined repeating radio frame, boundaries of at least some OFDM symbols transmitted in the first mode of operation with boundaries of at least some OFDM symbols transmitted in the second mode of operation.

In one embodiment, a total duration t1 of one non-prefixed OFDM symbol in the first mode of operation is an integer multiple of a duration t2 of one non-prefixed OFDM symbol in the second mode of operation. The memory 540 further stores instructions executable by the processor 530 to the effect that the received OFDM symbols have nominally been prefixed in such manner as to align boundaries of at least some OFDM symbols transmitted in the first mode of operation with boundaries of at least some OFDM symbols transmitted in the second mode of operation.

In one embodiment, alignment of boundaries occurs at least as often as the predefined repeating radio frame repeats.

In one embodiment, a total duration t1 of one non-prefixed OFDM symbol in the first mode of operation is an integer multiple of a duration t2 of one non-prefixed OFDM symbol in the second mode of operation. The memory 540 further stores instructions executable by the processor 530 to the effect that the received OFDM symbols have nominally been assigned prefixes of such lengths as to make the total duration of a first integer number $N_1$ of prefixed OFDM symbol transmitted in the first mode of operation equal to a total duration of a second integer number $N_2$ of prefixed OFDM symbols transmitted in the second mode of operation.

In one embodiment, the first integer number $N_1$ is 1 and the second integer number $N_2$ is greater than 1.

In one embodiment, with respect to the predefined repeating radio frame, a not-frame-initial boundary of a symbol transmitted in the first mode of operation is nominally aligned with a not-frame-initial boundary of a symbol transmitted in the second mode of operation.

In one embodiment, the first and second subcarrier spacings are related by a power of two, $f1/f2=2^q$ or $f1/f2=2^{-q}$, with $q \neq 1$ integer.

In one embodiment, the first subcarrier spacing f1 or the second subcarrier spacing f2 is a regular 3GPP LTE subcarrier spacing.

In one embodiment, the first subcarrier spacing f1 or the second subcarrier spacing f2=15 kHz.

In one embodiment, when the first subcarrier spacing f1=15 kHz, the second subcarrier spacing f2<15 kHz, or when the second subcarrier spacing f2=15 kHz, the first subcarrier spacing f1<15 kHz.

In one embodiment, the memory 540 further stores instructions executable by the processor 530 for causing the receiver 510 to receive, in a same radio frame, at least one OFDM symbol in the first mode of operation and at least two OFDM symbols in the second mode of operation.

In one embodiment, nominally a ratio of the first and second subcarrier spacings f1/f2 is equal to an inverse ratio of respective durations t1/t2 of non-prefixed OFDM symbols in the first and second modes of operation, $f1/f2=t2/t1$.

Figure 6:
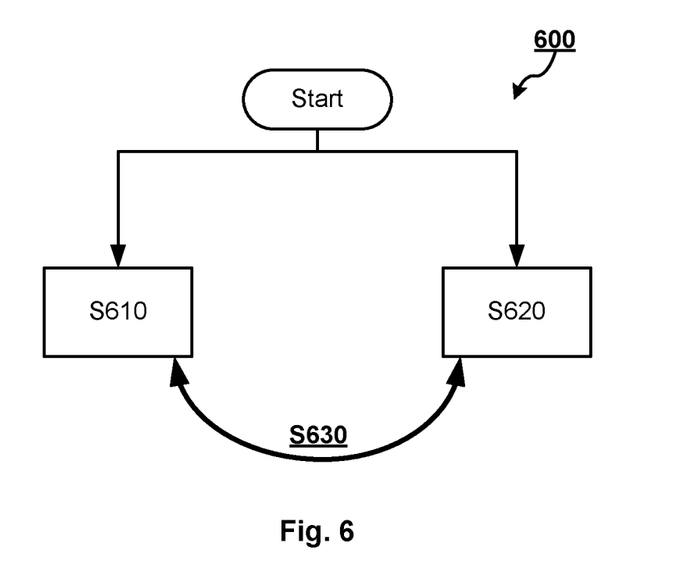
FIG. 6 is a flow chart showing a method 600 in a radio node according to some embodiments of the present disclosure.

FIG. 6 is a flow chart showing a method 600 in a radio node according to some embodiments of the present disclosure.

The method 600 comprises steps S610 and S620. In step S610, the radio node is in a first mode of operation with a first subcarrier spacing f1, a sequence of prefixed OFDM symbols is received from a first radio node. In step S620, the radio node is in a second mode of operation with a second subcarrier spacing f2, a sequence of prefixed OFDM symbols is received from a first radio node. In the method 600, the received sequence of OFDM symbols is assumed to be nominally aligned with a predefined repeating radio frame, which is common to both the first and second modes of operation, or with an integer multiple of the predefined repeating radio frame; and the first and second subcarrier spacings are related by an integer factor, $f1/f2=p$ or $f1/f2=1/p$, with $p \neq 1$ integer.

In one embodiment, the method 600 further includes a step S630 of alternating between the first and second modes of operation (double-ended arrow in FIG. 6). Furthermore, said alternating is performed inside one radio frame.

Figure 7:
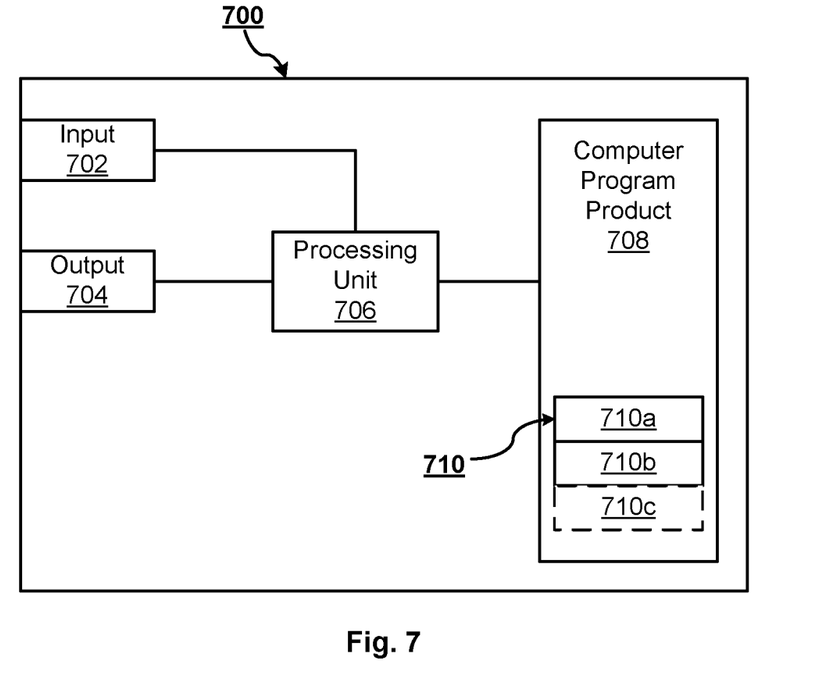
FIG. 7 schematically shows an embodiment of an arrangement 700 which may be used in radio node 300/500.

FIG. 7 schematically shows an embodiment of an arrangement 700 which may be used in radio node 300/500.

Comprised in the arrangement 700 are here a processing unit 706, e.g., with a Digital Signal Processor (DSP). The processing unit 706 may be a single unit or a plurality of units to perform different actions of procedures described herein. The arrangement 700 may also comprise an input unit 702 for receiving signals from other entities, and an output unit 704 for providing signal(s) to other entities. The input unit and the output unit may be arranged as an integrated entity or as illustrated in the example of FIG. 7.

Furthermore, the arrangement 700 comprises at least one computer program product 708 in the form of a non-volatile or volatile memory, e.g., an Electrically Erasable Programmable Read-Only Memory (EEPROM), a flash memory and a hard drive. The computer program product 708 comprises a computer program 710, which comprises code/computer readable instructions, which when executed by the processing unit 706 in the arrangement 700 causes the arrangement 700 and/or the radio node in which it is comprised to perform the actions, e.g., of the procedure described earlier in conjunction with FIG. 4 and/or FIG. 6.

The computer program 710 may be configured as a computer program code structured in computer program modules 710a-710c.

Hence, in exemplifying embodiments corresponding to FIG. 4, the code in the computer program 710 of the arrangement 700 comprises first mode operation module 710a for causing the output unit 704 to transmit, in a first mode of operation with a first subcarrier spacing f1, a sequence of prefixed OFDM symbols; and second mode operation module 710b for causing the output unit 704 to transmit, in a second mode of operation with a second subcarrier spacing f2: to transmit a sequence of prefixed OFDM symbols. Alternating module 710c is optional for causing the output unit 704 to alternate between the first and second modes of operation.

In exemplifying embodiments corresponding to FIG. 6, the code in the computer program 710 of the arrangement 700 comprises first mode operation module 710a for causing the input unit 702 to receive, in a first mode of operation with a first subcarrier spacing f1, a sequence of prefixed OFDM symbols from a first radio node; and second mode operation module 710b for causing the input unit 702 to receive, in a second mode of operation with a second subcarrier spacing f2, a sequence of prefixed OFDM symbols from a first radio node. Alternating module 710c is optional for causing the input unit 702 to alternate between the first and second modes of operation.

Although the code means in the embodiments disclosed above in conjunction with FIG. 7 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

In an embodiment of the present disclosure, there is provided a computer-readable storage medium (e.g., computer program product 708) storing instructions that when executed, cause one or more computing devices to perform the methods according to the present disclosure.

Although the present technology has been described above with reference to specific embodiments, it is not intended to be limited to the specific form set forth herein.

For example, the embodiments presented herein are not limited to the existing NR/LTE configuration; rather they are equally applicable to new NR/LTE configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

Note on NR Terminology

The 3GPP has issued agreements concerning NR terminology in the period between the earliest priority date and the filing date of the present disclosure. NR terminology and LTE terminology coincide to a considerable extent; for instance, a resource element (RE) remains 1 subcarrier×1 OFDM symbol. Yet some terms known in LTE have been given a new meaning in NR. This disclosure, including the claims, applies prefixes "LTE" and "NR" when indefiniteness could otherwise arise. Examples: An LTE subframe lasting 1 ms contains 14 OFDM symbols for normal CP. An NR subframe has a fixed duration of 1 ms and may therefore contain a different number of OFDM symbols for different subcarrier spacings. An LTE slot corresponds to 7 OFDM symbols for normal CP. An NR slot corresponds to 7 or 14 OFDM symbols; at 15 kHz subcarrier spacing, a slot with 7 OFDM symbols occupies 0.5 ms. Concerning NR terminology, reference is made to 3GPP TR 38.802 v14.0.0 and later versions.

A non-prefixed term in this disclosure is to be understood in the LTE sense unless otherwise stated. However, any term designating an object or operation known from LTE is expected to be reinterpreted functionally in view of NR specifications. Examples: An LTE radio frame may be functionally equivalent to an NR frame, considering that both have a duration of 10 ms. An LTE eNB may be functionally equivalent to an NR gNB, since their functionalities as downlink transmitter are at least partially overlapping. The least schedulable resource unit in LTE may be reinterpreted as the least schedulable resource unit in NR. The shortest data set for which LTE acknowledgement feedback is possible may be reinterpreted as the shortest data set for which NR acknowledgement feedback is possible.

Therefore, even though some embodiments of this disclosure have been described using LTE-originated terminology, they remain fully applicable to NR technology.

What is claimed is:

1. A first radio node configured for orthogonal frequency division multiplexing, OFDM, comprising:
   a receiver;
   a transmitter;
   a processing circuitry operatively connected to the transmitter and receiver, the processing circuitry being configured to:
      transmit a sequence of prefixed OFDM symbols in a first mode of operation with a first subcarrier spacing f1 or in a second mode of operation with a subcarrier spacing f2;
      wherein the first and second subcarrier spacings are related by a non-unit integer factor, f1/f2=p or f1/f2=1/p, with p≠1 integer; and
      wherein the sequence of OFDM symbols aligned with a predefined repeating radio frame, which is common to both the first and second modes of operation, or with an integer multiple of the predefined repeating radio frame.

2. The first radio node of claim 1, wherein a total duration of one prefixed OFDM symbol transmitted in the first mode of operation is equal to a total duration of an integer number of prefixed OFDM symbols transmitted in the second mode of operation.

3. The first radio node of claim 1, wherein a total duration of one prefixed OFDM symbol transmitted in the first mode of operation is equal to a total duration of an integer number of corresponding prefixed OFDM symbols transmitted in the second mode of operation.

4. The first radio node of claim 2, wherein in every 0.5 ms duration in the first or second mode of operation, an initial prefixed OFDM symbol in the sequence of prefixed OFDM symbols has a longer prefix than any remaining prefixed OFDM symbol(s), and the remaining prefixed OFDM symbols have prefixes of the same length.

5. The first radio node of claim 2, wherein the beginning and end of said one prefixed OFDM symbol transmitted in the first mode of operation are aligned, with respect to the predefined repeating radio frame or a multiple of the predefined repeating radio frame, with the beginning and end of a sequence of an integer number of prefixed OFDM symbols transmitted in the second mode of operation.

6. The first radio node of claim 2, wherein the beginning and end of said one prefixed OFDM symbol transmitted in the first mode of operation are aligned with the beginning and end of a sequence of an integer number of prefixed OFDM symbols transmitted in the second mode of operation.

7. The first radio node of claim 1, wherein:
   a total duration t1 of one non-prefixed OFDM symbol in the first mode of operation is an integer multiple of a duration t2 of one non-prefixed OFDM symbol in the second mode of operation; and
   the processing circuitry is further configured to prefix the OFDM symbols in such manner as to align, with respect to the predefined repeating radio frame, boundaries of at least some OFDM symbols transmitted in the first mode of operation with boundaries of at least some OFDM symbols transmitted in the second mode of operation.

8. The first radio node of claim 1, wherein:
   a total duration t1 of one non-prefixed OFDM symbol in the first mode of operation is an integer multiple of a duration t2 of one non-prefixed OFDM symbol in the second mode of operation; and
   the processing circuit is further configured to prefix the OFDM symbols in such manner as to align boundaries of at least some OFDM symbols transmitted in the first mode of operation with boundaries of at least some OFDM symbols transmitted in the second mode of operation.

9. The first radio node of claim 8, wherein alignment of boundaries occurs at least as often as the predefined repeating radio frame repeats.

10. The first radio node of claim 1, wherein:
   a total duration t1 of one non-prefixed OFDM symbol in the first mode of operation is an integer multiple of a duration t2 of one non-prefixed OFDM symbol in the second mode of operation, and
   the processing circuitry further configured to assign prefixes of such lengths as to make a total duration of a first integer number $N_1$ of prefixed OFDM symbol transmitted in the first mode of operation equal to a total duration of a second integer number $N_2$ of prefixed OFDM symbols transmitted in the second mode of operation.

11. The first radio node of claim 1, wherein, with respect to the predefined repeating radio frame, a not-frame-initial boundary of a symbol transmitted in the first mode of operation is aligned with a not-frame-initial boundary of a symbol transmitted in the second mode of operation.

12. The first radio node of claim 1, wherein the first and second subcarrier spacings are related by a power of two, $f1/f2=2^q$ or $f1/f2=2^{-q}$, with $q \neq 1$ integer.

13. A method in an orthogonal frequency division multiplexing (OFDM) first radio node, the method comprising:
   transmitting, in a first mode of operation with a first subcarrier spacing f1 or a second mode of operation with a subcarrier spacing of f2, a sequence of prefixed OFDM symbols;
   wherein the sequence of transmitted OFDM symbols is aligned with a predefined repeating radio frame, which is common to both the first and second modes of operation, or with an integer multiple of the predefined repeating radio frame; and
   wherein the first and second subcarrier spacings are related by an integer factor, $f1/f2=p$ or $f1/f2=1/p$, with $p \neq 1$ integer.

14. A second radio node configured for orthogonal frequency division multiplexing, OFDM, comprising:
   a receiver;
   a transmitter, a processor; and
   a processing circuitry operatively connected to the transmitter and receiver, the processing circuitry being configured to:
      receive, in a first mode of operation with a first subcarrier spacing f1 or in a second mode of operation with a second subcarrier spacing f2, a sequence of prefixed OFDM symbols from a first radio node, wherein the first and second subcarrier spacings are related by an integer factor, $f1/f2=p$ or $f1/f2=1/p$, with $p \neq 1$ integer; and
      wherein the processing circuitry receives the sequence of received OFDM symbols assuming it to be nominally aligned with a predefined repeating radio frame, which is common to both the first and second modes of operation, or with an integer multiple of the predefined repeating radio frame.

15. A method in an orthogonal frequency division multiplexing, OFDM, second radio node, the method comprising
   receiving, in a first mode of operation with a first subcarrier spacing f1, a sequence of prefixed OFDM symbols from a first radio node; and
   receiving, in a second mode of operation with a second subcarrier spacing f2, a sequence of prefixed OFDM symbols from the first radio node,
   wherein the received sequence of OFDM symbols is assumed to be nominally aligned with a predefined repeating radio frame, which is common to both the first and second modes of operation, or with an integer multiple of the predefined repeating radio frame; and
   wherein the first and second subcarrier spacings are related by an integer factor, $f1/f2=p$ or $f1/f2=1/p$, with $p \neq 1$ integer.

16. A first radio node configured for orthogonal frequency division multiplexing, OFDM, comprising:
   a receiver;
   a transmitter;
   a processing circuitry operatively connected to the transmitter and receiver, the processing circuitry being configured to:
   transmit a sequence of prefixed OFDM symbols in a first mode of operation with a first subcarrier spacing f1 or in a second mode of operation with a subcarrier spacing f2;
   wherein the first and second subcarrier spacings are related by a non-unit integer factor, $f1/f2=p$ or $f1/f2=1/p$, with $p \neq 1$ integer;
   wherein the sequence of OFDM symbols aligned with a predefined repeating radio frame, which is common to both the first and second modes of operation, or with an integer multiple of the predefined repeating radio frame;
   wherein in every 0.5 ms duration in the first or second mode of operation, an initial prefixed OFDM symbol in the sequence of prefixed OFDM symbols has a longer prefix than any remaining prefixed OFDM symbol(s), and the remaining prefixed OFDM symbols have prefixes of the same length; and
   wherein the beginning and end of one prefixed OFDM symbol transmitted in the first mode of operation are aligned with the beginning and end of a sequence of an integer number of prefixed OFDM symbols transmitted in the second mode of operation.

17. A method in an orthogonal frequency division multiplexing (OFDM) first radio node, the method comprising:
   transmitting, in a first mode of operation with a first subcarrier spacing f1 or a second mode of operation with a subcarrier spacing of f2, a sequence of prefixed OFDM symbols;
   wherein the sequence of transmitted OFDM symbols is aligned with a predefined repeating radio frame, which is common to both the first and second modes of operation, or with an integer multiple of the predefined repeating radio frame; and wherein the first and second subcarrier spacings are related by an integer factor, $f1/f2=p$ or $f1/f2=1/p$, with $p \neq 1$ integer;
   wherein in every 0.5 ms duration in the first or second mode of operation, an initial prefixed OFDM symbol in the sequence of prefixed OFDM symbols has a longer prefix than any remaining prefixed OFDM symbol(s), and the remaining prefixed OFDM symbols have prefixes of the same length; and
   wherein the beginning and end of one prefixed OFDM symbol transmitted in the first mode of operation are aligned with the beginning and end of a sequence of an integer number of prefixed OFDM symbols transmitted in the second mode of operation.

18. A second radio node configured for orthogonal frequency division multiplexing, OFDM, comprising:
   a receiver;
   a transmitter, a processor; and
   a processing circuitry operatively connected to the transmitter and receiver, the processing circuitry being configured to:
   receive, in a first mode of operation with a first subcarrier spacing f1 or in a second mode of operation with a second subcarrier spacing f2, a sequence of prefixed OFDM symbols from a first radio node, wherein the first and second subcarrier spacings are related by an integer factor, $f1/f2=p$ or $f1/f2=1/p$, with $p \neq 1$ integer;
   wherein the processing circuitry receives the sequence of received OFDM symbols assuming it to be nominally aligned with a predefined repeating radio frame, which is common to both the first and second modes of operation, or with an integer multiple of the predefined repeating radio frame;

wherein in every 0.5 ms duration in the first or second mode of operation, an initial prefixed OFDM symbol in the sequence of prefixed OFDM symbols has a longer prefix than any remaining prefixed OFDM symbol(s), and the remaining prefixed OFDM symbols have prefixes of the same length; and wherein the beginning and end of one prefixed OFDM symbol transmitted in the first mode of operation are aligned with the beginning and end of a sequence of an integer number of prefixed OFDM symbols transmitted in the second mode of operation.

19. A method in an orthogonal frequency division multiplexing, OFDM, second radio node, the method comprising receiving, in a first mode of operation with a first subcarrier spacing f1, a sequence of prefixed OFDM symbols from a first radio node; and receiving, in a second mode of operation with a second subcarrier spacing f2, a sequence of prefixed OFDM symbols from the first radio node, wherein the received sequence of OFDM symbols is assumed to be nominally aligned with a predefined repeating radio frame, which is common to both the first and second modes of operation, or with an integer multiple of the predefined repeating radio frame; and wherein the first and second subcarrier spacings are related by an integer factor, f1/f2=p or f1/f2=1/p, with $p \neq 1$ integer;

wherein in every 0.5 ms duration in the first or second mode of operation, an initial prefixed OFDM symbol in the sequence of prefixed OFDM symbols has a longer prefix than any remaining prefixed OFDM symbol(s), and the remaining prefixed OFDM symbols have prefixes of the same length; and wherein the beginning and end of one prefixed OFDM symbol transmitted in the first mode of operation are aligned with the beginning and end of a sequence of an integer number of prefixed OFDM symbols transmitted in the second mode of operation.

* * * * *